United States Patent
Sasaki et al.

(10) Patent No.: US 9,893,360 B2
(45) Date of Patent: Feb. 13, 2018

(54) ELECTRODE FOR LITHIUM ION SECONDARY BATTERY AND LITHIUM ION SECONDARY BATTERY USING SAME

(71) Applicant: NEC Corporation, Tokyo (JP)

(72) Inventors: Hideaki Sasaki, Tokyo (JP); Takehiro Noguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 267 days.

(21) Appl. No.: 14/646,076

(22) PCT Filed: Nov. 19, 2013

(86) PCT No.: PCT/JP2013/081199
§ 371 (c)(1),
(2) Date: May 20, 2015

(87) PCT Pub. No.: WO2014/080915
PCT Pub. Date: May 30, 2014

(65) Prior Publication Data
US 2015/0311530 A1    Oct. 29, 2015

(30) Foreign Application Priority Data
Nov. 21, 2012 (JP) .................................. 2012-255741

(51) Int. Cl.
| | |
|---|---|
| *H01M 4/62* | (2006.01) |
| *H01M 4/1391* | (2010.01) |
| *H01M 4/505* | (2010.01) |
| *H01M 4/525* | (2010.01) |
| *H01M 4/13* | (2010.01) |
| *H01M 10/0525* | (2010.01) |
| *C08L 27/06* | (2006.01) |
| *C08L 27/16* | (2006.01) |
| *H01M 4/04* | (2006.01) |
| *H01M 4/02* | (2006.01) |

(52) U.S. Cl.
CPC ............. *H01M 4/623* (2013.01); *C08L 27/06* (2013.01); *C08L 27/16* (2013.01); *H01M 4/0404* (2013.01); *H01M 4/13* (2013.01); *H01M 4/1391* (2013.01); *H01M 4/505* (2013.01); *H01M 4/525* (2013.01); *H01M 4/622* (2013.01); *H01M 10/0525* (2013.01); *C08L 2205/02* (2013.01); *H01M 2004/028* (2013.01); *Y02T 10/7011* (2013.01)

(58) Field of Classification Search
CPC ...................................................... H01M 4/623
See application file for complete search history.

(56) References Cited

U.S. PATENT DOCUMENTS

| | | |
|---|---|---|
| 6,355,380 B1 | 3/2002 | Yun et al. |
| 2003/0031923 A1* | 2/2003 | Aoshima ............... H01M 2/021 429/127 |

FOREIGN PATENT DOCUMENTS

| | | |
|---|---|---|
| JP | 10-214629 | 8/1998 |
| JP | 2000-48805 | 2/2000 |
| JP | 2000-90728 | 3/2000 |
| JP | 2000-323131 | 11/2000 |
| JP | 2000-348729 | 12/2000 |
| JP | 2001-15104 | 1/2001 |
| JP | 2002-260736 | 9/2002 |
| JP | 2007-109628 | 4/2007 |
| JP | 2012-3891 | 1/2012 |

OTHER PUBLICATIONS

International Search Report dated Jan. 14, 2014 in corresponding PCT International application.
Decision to Grant a Patent dated Nov. 21, 2017, by Japanese Patent Office in counterpart Japanese Patent Application No. 2014-548584.

* cited by examiner

*Primary Examiner* — Peter F Godenschwager
(74) *Attorney, Agent, or Firm* — Finnegan, Henderson, Farabow, Garrett & Dunner, L.L.P.

(57) ABSTRACT

An electrode for a lithium ion secondary battery comprising a binder comprising a vinyl chloride resin (PVC) and a polyvinylidene fluoride (PVDF), wherein the weight ratio of the PVC and the PVDF is PVC:PVDF=8:2 to 3:7, and at least one of the following (a) and (b) is satisfied: (a) the polymerization degree of the PVC is 900 or more, and (b) the polymerization degree of the PVDF is 5000 or more.

6 Claims, 1 Drawing Sheet

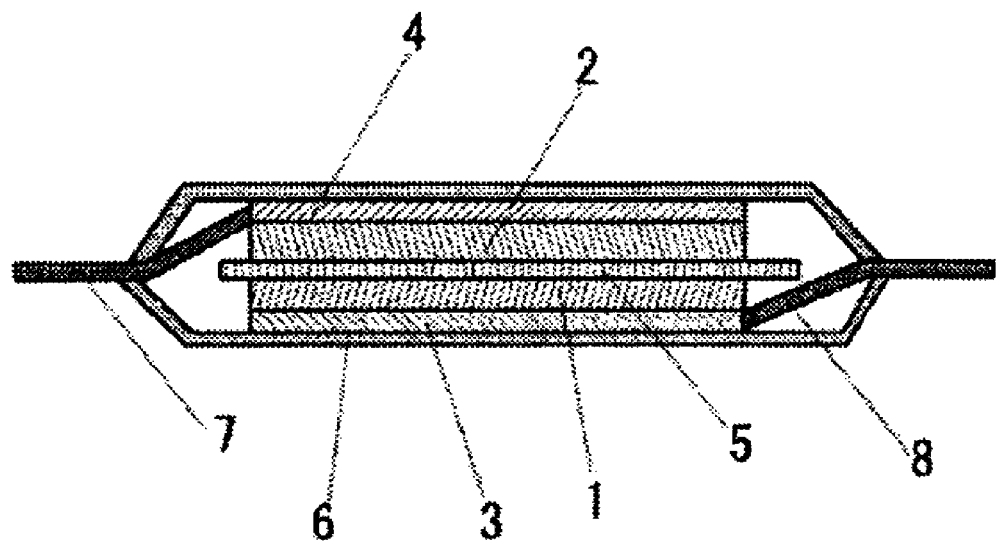

ELECTRODE FOR LITHIUM ION SECONDARY BATTERY AND LITHIUM ION SECONDARY BATTERY USING SAME

CROSS-REFERENCE TO RELATED PATENT APPLICATIONS

This application is a National Stage Entry of International Application No. PCT/JP2013/081199, filed Nov. 19, 2013, which claims priority from Japanese Patent Application No. 2012-255741, filed Nov. 21, 2012. The entire contents of the above-referenced applications are expressly incorporated herein by reference.

TECHNICAL FIELD

The present invention relates to an electrode for a lithium ion secondary battery and a lithium ion secondary battery using the same.

BACKGROUND ART

A lithium ion secondary battery is small in volume, has a large mass capacity density, and is capable of taking out a high voltage, and therefore, is widely adopted as a power source for small devices. The lithium ion secondary battery is used as, for example, a power source for mobile devices such as a cellular phone and a notebook-sized personal computer. In addition to its application to small devices, in recent years, due to concern for environmental issues and increasing awareness of energy-conservation, an application of the lithium ion secondary battery to large secondary batteries has been expected in the field where a large capacity with long life is required such as electric vehicles (EV) or electric power storage.

An electrode of a secondary battery is formed by forming an electrode mixture layer on a collector, and the electrode mixture layer is consisting of an active material, a conductive assistant, a binder, and so on. The binder has a function of adhering the active materials each other, and adhering between the active material and the collector. In view of battery performance, and easiness of compatibility with battery production process and so on, it is desired that the binder is excellent in basic properties such as electrochemical stability, resistance to electrolyte solutions, adhesiveness, and heat resistance. On the other hand, in view of the recent demand for cost reduction of large batteries, it is desired that the materials are as inexpensive as possible.

In negative electrodes of the lithium ion secondary batteries, aqueous binders using a rubber type latex such as styrene butadiene rubber (SBR) and a thickener such as CMC (carboxymethyl cellulose) in combination have often been used in addition to solvent-based binders such as polyvinylidene fluoride (PVDF). On the other hand, in positive electrodes, binders other than PVDF or fluoropolymers having a composition close to that of PVDF have hardly been put into practical use.

PVDF has high performance in various properties such as oxidation resistance, heat resistance, adhesiveness and resistance to electrolyte solutions, and is excellent in balance among these properties. Moreover, when PVDF is used, it is easy to obtain electrode slurry having a good coating property. However, there have been problems that the resin price of PVDF is as high as around 2000 yen/kg which is higher than that of other resins, and PVDF has a drawback in terms of alkali resistance. On the other hand, there has yet been found no material that can substitute for PVDF in terms of properties, and PVDF has still been used for long years.

As a binder other than PVDF, for example, Patent Literature 1 discloses that polyvinyl chloride (PVC) is used as a binder containing a halogen element as PVDF. Patent Literature 2 to Patent Literature 5 also disclose polyvinyl chloride as an example of the binder. Polyvinyl chloride (PVC) is a general-purpose resin and is very inexpensive.

CITATION LIST

Patent Literature

Patent Literature 1: Japanese Patent Laid-Open No. 2000-348729
Patent Literature 2: Japanese Patent Laid-Open No. 2000-323131
Patent Literature 3: Japanese Patent Laid-Open No. 2000-048805
Patent Literature 4: Japanese Patent Laid-Open No. 2001-015104
Patent Literature 5: Japanese Patent Laid-Open No. 10-214629

SUMMARY OF INVENTION

Technical Problem

However, according to the studies of the present inventors, polyvinyl chloride (PVC) is inferior to PVDF in any of adhesiveness, heat resistance, and oxidation resistance, and therefore, the secondary battery produced by using PVC is remarkably inferior to the secondary battery produced by using PVDF in the cycle properties at elevated temperatures, and it became clear that it is difficult to actually put PVC into practical use as a binder for batteries. That is to say, when the PVC disclosed in Patent Literatures 1 to 5 is used, there was a major problem with the cycle properties at elevated temperatures.

An object of the present invention is to provide an electrode having a binder which is inexpensive and has performance capable of substituting for the binder consisting of PVDF only, and a secondary battery using the same.

Solution to Problem

An embodiment of the present invention relates to the following matter.

An electrode for a lithium ion secondary battery comprising a binder comprising a vinyl chloride resin (PVC) and a polyvinylidene fluoride (PVDF) wherein
the weight ratio of the PVC and the PVDF is PVC:PVDF=8:2 to 3:7, and
at least one of the following (a) and (b) is satisfied:
(a) the polymerization degree of the PVC is 900 or more, and
(b) the polymerization degree of the PVDF is 5000 or more.

Advantageous Effects of Invention

According to an embodiment of present invention, a secondary battery that is inexpensive, easily compatible with the existing electrode production process, and excellent in capacity retention ratio in charge and discharge cycles can be provided.

BRIEF DESCRIPTION OF DRAWING

FIG. 1 is a cross sectional view illustrating an example of a secondary battery according to an embodiment of the present invention.

DESCRIPTION OF EMBODIMENTS

[Binder]

The inventors of the present invention have made diligent studies to solve the above described problems, and found out that a mixture of PVC and PVDF has a property suitable for a binder for secondary batteries and exhibits battery performance which is capable of substituting for PVDF. In Patent Literatures 2 to 5, although it is described that a polyvinyl chloride, a polyvinylidene fluoride, and a mixture thereof can be used as a binder, there is no specific description such as purposes or effects, appropriate mixing ratio or polymerization degree of the polymers, or method of using. The price of PVC is about ⅕ or less compared to PVDF, and a secondary battery of low-cost and excellent in life performance can be provided by using PVC. In the present specification, when described as "binder for secondary batteries" or simply as "binder", it refers to a binder that can be used for either one of, or both of a positive electrode and a negative electrode unless explicitly noted otherwise.

Furthermore, the inventors of the present invention have found out the mixing ratio (weight ratio) of PVC and PVDF and the polymerization degree of each compound that are more suitable for the use as a binder for secondary batteries. It was also found out that, as a result of the above, the adhesive strength of electrodes can be more enhanced and the compatibility with battery production process can be more improved.

The binder used for the electrode for lithium ion secondary batteries of an embodiment of the present invention comprises a vinyl chloride resin (PVC) and a polyvinylidene fluoride (PVDF), and the weight ratio of the PVC and the PVDF is PVC:PVDF=8:2 to 3:7. Furthermore, the binder used for the present embodiment satisfies at least one of the following condition (a) and condition (b):
(a) the polymerization degree of PVC is 900 or more, and
(b) the polymerization degree of PVDF is 5000 or more.

In the present specification, the polymerization degree refers to the weight-average polymerization degree.

PVC included in the binder used for the present embodiment may comprise another monomer that is copolymerizable with vinyl chloride, and PVDF may have another functional group other than F. Moreover, PVC and PVDF may have a functional group such as hydroxyl group or carboxyl group. In some cases, the adhesive strength between the binder and current-collecting foil can be more enhanced by introducing such functional group.

Both PVC and PVDF contain halogen, however, the chlorine content in PVC is 56.8 mass % while the fluorine content in PVDF is 59.4 mass %, and thus the halogen content is lower in PVC. The ratio between the number of hydrogen atoms and the number of halogen atoms in the main chain of the polymers is Cl:H=1:3 for PVC while F:H=1:1 for PVDF. It is assumed that, although there is a difference in halogen species, PVC used alone is considerably inferior to PVDF in any of adhesiveness, heat resistance, and oxidation resistance owing to the lower halogen content, and thus properties as a binder for secondary batteries are insufficient.

In the present embodiment, by using a binder in which the weight ratio of PVC and PVDF is PVC:PVDF=8:2 to 3:7, it is possible to achieve both a low-cost and high-temperature cycle properties which is capable of substituting for PVDF used alone.

In the present embodiment, polymerization degree of PVC is preferably 500 or more, more preferably 900 or more, and further more preferably 1000 or more. The upper limit for the polymerization degree of PVC is not particularly limited, but is preferably 10000 or less in view of solubility to solvents. When the polymerization degree of PVC is 1000 or more, the adhesiveness among active materials and between the active materials and a collector can be more enhanced.

In the present embodiment, polymerization degree of PVDF is preferably 5000 or more, more preferably 5400 or more, and further more preferably 9000 or more. The upper limit value is not particularly limited, and is preferably 20000 or less in view of solubility to solvents. When polymerization degree of PVDF is 5000 or more, the adhesiveness among active materials and between the active materials and a collector becomes more excellent.

In the present embodiment, it is particularly preferable that polymerization degree of PVC is 900 or more and polymerization degree of PVDF is 5000 or more.

The adhesiveness obtained by using PVC and PVDF as a binder is influenced not only by the molecular structure of the polymers, but also greatly influenced by the difference in polymerization degree of the polymers. PVC is known for its use as an adhesive, and in this case, the adhesive strength is often higher when the molecular weight is smaller. However, when PVC is used as an electrode binder, since the active material accounts for 90 mass % or more of the electrode and the amount of the binder is as small as less than 10 mass %, the force to anchor the active material together becomes stronger as the polymer molecule is longer (the polymerization degree is higher), and the adhesive strength as an electrode binder can be more increased. PVC having a high polymerization degree is often difficult to obtain as a commercial product while PVDF having a high polymerization degree is readily available as a product for a binder for secondary batteries.

Moreover, PVDF is generally sensitive to an alkali, and thus there has been a problem that the electrode slurry is gelled in the case where a material having a high alkalinity such as lithium nickelate is used, for example. On the other hand, PVC has a high alkali resistance, and is therefore free from such problem of gelation, and thus, a favorable electrode slurry can be obtained even with a material having a high alkalinity. Accordingly, a binder comprising PVC can be used more suitably in the electrode comprising lithium nickelate.

The above described binder comprising PVC and PVDF can be used as a binder for either one of, or both of the positive electrode and the negative electrode, and more preferably, is used as a binder for the positive electrode.

The above described binder comprising PVC and PVDF may comprise another compound. The total content of PVC and PVDF is not particularly limited, but is preferably 10 mass % or more and 100 mass % or less, and more preferably 30 mass % or more and 100 mass % or less in the total mass of the binder for the positive electrode or the total mass of the binder for the negative electrode.

In the present embodiment, the positive electrode binder may comprise a fluororesin other than PVDF or an acrylic resin in addition to the above-mentioned PVC and PVDF, and 3 or more kinds of compounds may be used in combination.

In the present embodiment, the negative electrode binder preferably comprises a binder containing the above-mentioned PVC and PVDF. Moreover, a fluororesin other than PVDF, an acrylic resin or the like may be used, and a mixture of those with PVC and PVDF may also be used. Or alternatively to the above, a rubber-based compound such as styrene butadiene rubber (SBR) can be used. In the case of using the rubber-based compound, a thickener such as carboxymethyl cellulose (CMC) or a sodium salt thereof can be used in combination.

[Secondary Battery]

The secondary battery of the present embodiment is not particularly limited as long as it comprises an electrode of the present embodiment, namely, an electrode having a binder comprising PVC and PVDF under the prescribed condition, as a positive electrode and/or a negative electrode. A laminate type secondary battery is illustrated in FIG. 1 as an example of the secondary battery according to the present embodiment. In the secondary battery illustrated in FIG. 1, a separator 5 is sandwiched between a positive electrode and a negative electrode wherein the positive electrode is composed of a positive electrode active material layer 1 containing a positive electrode active material, a positive electrode binder and a positive electrode collector 3, and the negative electrode is composed of a negative electrode active material layer 2 containing a negative electrode active material capable of occluding and releasing lithium and a negative electrode collector 4. The positive electrode collector 3 is connected to a positive electrode tab 8, and the negative electrode collector 4 is connected to a negative electrode tab 7. A laminate-type outer package 6 is used as an outer package, and the inside of the secondary battery is filled with a nonaqueous electrolyte solution.

[Positive Electrode]

The positive electrode of the secondary battery according to the present embodiment is not particularly limited but for example, a constitution in which a positive electrode active material layer is formed on at least one face of a positive electrode collector. The positive electrode active material layer is not particularly limited but comprises a positive electrode active material, a positive electrode binder, and a conductive assistant for example.

(Positive Electrode Active Material)

The positive electrode active material contained in the positive electrode of the secondary battery according to the present embodiment is not particularly limited, and a lithium-containing composite oxide can be used. As a lithium-containing composite oxide, $LiM1O_2$ (M1 is at least one element selected from the group consisting of Mn, Fe, Co, and Ni, and a part of M1 may be substituted with Mg, Al, or Ti), $LiMn_{2-x}M2_xO_4$ (M2 is at least one element selected from the group consisting of Mg, Al, Co, Ni, Fe, and B, and $0 \leq x < 2$), and the like can be used. An olivine type material represented by $LiFePO_4$ can also be used. These materials may have a non-stoichiometric composition such as a Li excess composition. These materials may be used singly or in combination of two or more kinds. Among these, in particular, although the capacity is lower than that of lithium cobaltate ($LiCoO_2$) or lithium nickelate ($LiNiO_2$), lithium manganate represented by the aforementioned $LiMn_{2-x}M2_xO_4$ is of low-cost in terms of material cost because production amount of Mn is larger than that of Ni and Co, and has high heat stability because it has a spinel structure, and for these reason, is preferable as a positive electrode active material for a large secondary battery for electric vehicles, electric power storage and so on. Lithium manganate can be used in a mixture with, for example, 15 to 35 mass % of lithium nickelate, which enables to increase the battery capacity while maintaining the heat stability as a positive electrode.

(Positive Electrode Binder, Conductive Assistant, and Collector)

As a positive electrode binder, the above-mentioned binders can be used.

Examples of the conductive assistant used for a positive electrode include carbon black, graphite, and carbon fiber. These may be used alone or in combination of two or more kinds.

As a positive electrode collector, aluminum, stainless steel, nickel, titanium, alloys thereof, or the like can be used.

The amount of the positive electrode binder relative to the total weight of the positive electrode active material, the positive electrode binder, and the conductive assistant is 1 weight % or more and 10 weight % or less, and more preferably 2 weight % or more and 6 weight % or less. The content of the conductive assistant can be, for example, 1 to 10 weight %.

(Method for Preparing Positive Electrode)

The method for preparing a positive electrode is not particularly limited. For example, the positive electrode active material, the positive electrode binder, and the conductive assistant are dispersed and kneaded in a prescribed blending amount in a solvent such as NMP, and the resultant positive electrode slurry is applied on the positive electrode collector. The positive electrode slurry is dried and subjected to heat treatment as needed, and thereby the positive electrode active material layer can be formed on the positive electrode collector. The positive electrode active material layer may appropriately be compressed by a roll press method or the like in order to adjust the density of the positive electrode active material layer.

[Negative Electrode]

The negative electrode of the secondary battery according to the present embodiment is not particularly limited but, for example, is a constitution in which a negative electrode active material layer is formed on at least one face of the negative electrode collector such as silver foil. The negative electrode active material layer comprises at least a negative electrode active material, a negative electrode binder, and a conductive assistant if necessary.

(Negative Electrode Active Material)

The negative electrode active material included in the negative electrode of the secondary battery according to the present embodiment is not particularly limited, and a carbon material such as graphite and amorphous carbon can be used, and it is preferable to use graphite from the viewpoint of energy density. As a negative electrode active material, materials that form an alloy with Li such as Si, Sn, and Al; Si oxides; Si composite oxides containing Si and a metal element other than Si; Sn oxides; Sn composite oxides containing Sn and a metal element other than Sn; and $Li_4Ti_5O_{12}$, or composite materials in which the above-described materials are covered with carbon; or the like can also be used. The negative electrode active materials can be used alone or in combination of two or more kinds. The average particle diameter (D50) of the negative electrode active material is preferably 5 to 50 μm, and more preferably 10 to 30 μm. The specific surface area of the negative electrode active material is preferably 0.5 to 5 $m^2/g$, and more preferably 0.5 to 2 $m^2/g$.

(Negative Electrode Binder, Conductive Assistant, and Negative Electrode Collector)

As a negative electrode binder, the above-described binders can be used.

Examples of the conductive assistant that is used for the negative electrode include high crystalline carbon, carbon black, and carbon fiber. These may be used alone or in combination of two or more kinds.

As a negative electrode collector, copper, stainless steel, nickel, titanium, alloys thereof, or the like can be used.

The amount of the negative electrode binder relative to the total weight of the negative electrode active material, the negative electrode binder, and the conductive assistant is preferably 1 weight % or more and 15 weight % or less, and more preferably 1 weight % or more and 8 weight % or less.

(Method for Preparing Negative Electrode)

The method for preparing the negative electrode is not particularly limited. For example, the negative electrode slurry is first prepared by dispersing and kneading the negative electrode active material, the negative electrode binder, and the conductive assistant if necessary in a prescribed blending amount in a solvent. Generally, as a solvent of the negative electrode slurry, an organic solvent such as NMP is used in the case where PVC or PVDF is used as a negative electrode binder, and water is used in the case where the rubber compound is used as a negative electrode binder. A thickener such as CMC can be used together as needed. The negative electrode can be prepared by applying this negative electrode slurry onto the negative electrode collector, and drying it. The electrode density of the obtained negative electrode can be adjusted by compressing the negative electrode active material layer by a roll press method or the like.

(Nonaqueous Electrolyte Solution)

The nonaqueous electrolyte solution is not particularly limited, but for example, a solution in which a lithium salt is dissolved in a nonaqueous solvent can be used.

Examples of the lithium salt include $LiPF_6$, lithium imide salts, $LiAsF_6$, $LiAlCl_4$, $LiClO_4$, $LiBF_4$, and $LiSbF_6$. Examples of the lithium imide salt include $LiN(C_kF_{2k+1}SO_2)(C_mF_{2m+1}SO_2)$ (k and m each independently represent 1 or 2). These may be used alone or in combination of two or more.

As a nonaqueous solvent, at least one solvent selected from the group consisting of cyclic carbonates, chain carbonates, aliphatic carboxylic acid esters, γ-lactones, cyclic ethers, and chain ethers can be used. Examples of the cyclic carbonate include propylene carbonate (PC), ethylene carbonate (EC), butylene carbonate (BC), and derivatives thereof (including fluorinated compounds). Examples of the chain carbonate include dimethyl carbonate (DMC), diethyl carbonate (DEC), ethyl methyl carbonate (EMC), dipropyl carbonate (DPC), and derivatives thereof (including fluorinated compounds). Examples of the aliphatic carboxylic acid ester include methyl formate, methyl acetate, ethyl propionate, and derivatives thereof (including fluorinated compounds). Examples of the γ-lactone include γ-butyrolactone and derivatives thereof (including fluorinated compounds). Examples of the cyclic ether include tetrahydrofuran, 2-methyltetrahydrofuran, and derivatives thereof (including fluorinated compounds). Examples of the chain ether include 1,2-diethoxy ethane (DEE), ethoxy methoxy ethane (EME), ethyl ether, diethyl ether, and derivatives thereof (including fluorinated compound). As a nonaqueous solvent, in addition to the above-described nonaqueous solvents, dimethyl sulfoxide, 1,3-dioxolane, formamide, acetoamide, dimethylformamide, dioxolane, acetonitrile, propionitrile, nitromethane, ethyl monoglyme, phosphoric acid triester, trimethoxy methane, dioxolane derivatives, sulfolane, methyl sulfolane, 1,3-dimethyl-2-imidazolidinone, 3-methyl-2-oxazolidinone, 1,3-propane sultone, anisole, N-methyl pyrrolidone, and derivatives thereof (including fluorinated compounds) can be used. These may be used alone or in combination of two or more kinds.

The concentration of the lithium salt in the nonaqueous electrolyte solution is preferably 0.7 mol/L or more and 1.5 mol/L or less. Sufficient ion conductivity can be obtained by setting the concentration of the lithium salt to 0.7 mol/L or more. By setting the concentration of the lithium salt to 1.5 mol/L or less, a low viscosity can be obtained and the transfer of lithium ions is not inhibited.

The nonaqueous electrolyte solution may comprise an additive in order to form an SEI (Solid Electrolyte Interface) film of better quality on the surface of the negative electrode. The SEI film has a function of suppressing the reactivity with the electrolyte solution, making the desolvation reaction associated with intercalating and deintercalating of the lithium ions smoother to prevent the deterioration of the structure of the negative electrode active material. Examples of such additive include propane sultone, vinylene carbonate, and cyclic disulfonic acid esters. These may be used alone, or in combination of two or more kinds.

The concentration of the additive in the nonaqueous electrolyte solution is preferably 0.2 mass % or more and 5 mass % or less relative to the total mass of the electrolyte solution. Sufficient SEI film can be formed by the concentration of the additive being 0.2 mass % or more. The resistance can be more reduced when the concentration of the additive is 5 mass % or less.

(Positive Electrode Tab and Negative Electrode Tab)

The positive electrode tab and the negative electrode tab are not particularly limited, but for example at least one selected from the group consisting of Al, Cu, phosphor bronze, Ni, Ti, Fe, brass, and stainless can be used.

(Separator)

The separator is not particularly limited, but porous films consisting of a polyolefin such as polypropylene and polyethylene or fluororesin or the like can be used. Cellulose or an inorganic separator such as a glass separator can also be used.

(Outer Package)

The outer package is not particularly limited, but cans of coin shaped, square shaped, cylindrical or the like, or a laminated outer package can be used. Among these, a laminated outer package that is a flexible film consisting of a laminated layer of a synthetic resin and metal foil is preferable from the viewpoint of capability of reducing weight, and increasing the energy density of secondary batteries. The laminate type secondary battery comprising a laminated outer package is also excellent in the heat dissipation property and therefore is suitable for a battery for cars such as an electric vehicle.

(Method for Producing Secondary Battery)

The method for producing the secondary battery according to the present embodiment is not particularly limited, but examples of which include the method shown below. A positive electrode tab and a negative electrode tab are respectively connected through a positive electrode collector and a negative electrode collector to the positive electrode and the negative electrode. The positive electrode and the negative electrode are disposed face to each other with a separator interposed therebetween to prepare an electrode laminated body. The electrode laminated body is housed in an outer package and immersed in an electrolyte solution. The secondary battery is prepared by sealing the outer package such that a part of the positive electrode tab and a part of the negative electrode tab are protruded to the outside.

EXAMPLES

Hereinafter, examples of the present embodiment will be described in detail, however, the present embodiment is not limited to the following examples.

In Examples and Comparative Examples below, the polymerization degree of PVC represents the weight-average polymerization degree measured by a method in accordance with JIS-K6720-2 based on the solution viscosity, and the polymerization degree of PVDF represents the weight-average polymerization degree measured by dissolving a sample in a solvent such as DMF or NMP and measuring by using a gel permeation chromatography (GPC) method.

Example 1

(Preparation of Negative Electrode)

A negative electrode slurry was prepared by kneading and dispersing graphite powder (average particle diameter (D50): 22 μm, specific surface area: 1.0 m$^2$/g) as a negative electrode active material and PVDF (polymerization degree: 9000) as a negative electrode binder uniformly in NMP such that the weight ratio of the respective solid content was 95:5. The negative electrode slurry was applied on a copper foil having a thickness of 15 μm as a negative electrode collector. Thereafter, a negative electrode active material layer was formed by conducting drying at 125° C. for 10 minutes to evaporate NMP. A negative electrode was prepared by pressing the negative electrode active material layer. The mass of the negative electrode active material layer per unit area after drying was set to 0.008 g/cm$^2$.

(Preparation of Positive Electrode)

As a positive electrode active material, LiMn$_2$O$_4$ powder (average particle diameter (D50): 15 μm, specific surface area: 0.5 m$^2$/g) was prepared. A positive electrode slurry was prepared by dispersing the positive electrode active material, PVC (polymerization degree: 1000) and PVDF (polymerization degree: 9000) as a positive electrode binder, and carbon black as a conductive assistant in a weight ratio of 91:2:2:5 uniformly in NMP. The positive electrode slurry was applied on aluminum foil having a thickness of 20 μm as a positive electrode collector. Thereafter, a positive electrode active material layer was formed by conducting drying at 125° C. for 10 minutes to evaporate NMP, followed by pressing to form a positive electrode. The mass of the positive electrode active material layer per unit area after drying was set to 0.024 g/cm$^2$. The weight ratio between PVC and PVDF, which is a positive electrode binder, is 5:5.

(Nonaqueous Electrolyte Solution)

A nonaqueous electrolyte solution was prepared by dissolving LiPF$_6$, as an electrolyte, in 1 mol/L in a nonaqueous solvent obtained by mixing EC (ethylene carbonate) and DEC (diethyl carbonate) in a ratio of EC:DEC=30:70 (volume %). 1.5 mass % of vinylene carbonate as an additive was added to this nonaqueous electrolyte solution.

(Preparation of Secondary Battery)

The prepared positive electrode and negative electrode were cut out to a size of 5 cm×6 cm, respectively. In each of the electrodes, a part of 5 cm×1 cm on one side was left as a part where an electrode active material layer was not formed (unapplied part) for the purpose of connecting a tab, and the part where the electrode active material layer was formed was set to 5 cm×5 cm. A positive electrode tab of aluminum having a width 5 mm×a length 3 cm×a thickness 0.1 mm was welded to the unapplied part of the positive electrode with a length of 1 cm by ultrasonic welding. A negative electrode tab of nickel having the same size as the positive electrode tab was welded to the unapplied part of the negative electrode by ultrasonic welding. The negative electrode and the positive electrode were disposed on both faces of a separator consisting of polyethylene and polypropylene and having a size of 6 cm×6 cm so that the electrode active material layers were overlapped across the separator to obtain an electrode laminated body. Three sides excluding one longer side of two pieces of aluminum laminate films each having a size of 7 cm×10 cm were adhered by heat fusion with an adhesion width of 5 mm to prepare a bag-shaped laminated outer package. The electrode laminated body was inserted into the bag-shaped laminated outer package such that the distance from one shorter side of the laminated outer package was 1 cm. Then, 0.2 g of the nonaqueous electrolyte solution was injected and vacuum impregnation was performed, and thereafter the open part was sealed by heat fusion with a sealing width of 5 mm under reduced pressure. A laminate type secondary battery was thereby prepared.

(First Charge and Discharge)

First charge and discharge was applied to the prepared secondary battery. First of all, charging was conducted up to 4.2 V at a constant current of 10 mA corresponding to 5 hour rate (0.2 C) at 20° C. Thereafter, charging at a constant voltage of 4.2 V was conducted for 8 hours in total. Then, discharging was conducted at a constant current of 10 mA down to 3.0 V.

(Cycle Test)

Charging was applied up to 4.2 V at 1 C (50 mA) to the secondary battery after the first charge and discharge was applied. Thereafter, charging at a constant voltage of 4.2 V was conducted for 2.5 hours in total. Then, discharging at a constant current was conducted down to 3.0 V at 1 C. This charge and discharge cycle was repeated 500 times under an environment at an elevated temperature of 55° C. as a deterioration acceleration test. The ratio of the discharging capacity after 500 cycles to the first discharging capacity was calculated as a capacity retention ratio (%).

Example 2

A secondary battery was prepared and evaluated in the same manner as in Example 1 except that the weight ratio of the positive electrode active material, PVC and PVDF as positive electrode binders, and carbon black as a conductive assistant was changed to 91:1.2:2.8:5. The weight ratio of PVC and PVDF is 3:7.

Example 3

A secondary battery was prepared and evaluated in the same manner as in Example 1 except that the weight ratio of the positive electrode active material, PVC and PVDF as positive electrode binders, and carbon black as a conductive assistant was changed to 91:2.8:1.2:5. The weight ratio of PVC and PVDF is 7:3.

Example 4

A secondary battery was prepared and evaluated in the same manner as in Example 1 except that the weight ratio of the positive electrode active material, PVC and PVDF as positive electrode binders, and carbon black as a conductive assistant was changed to 91:3.2:0.8:5. The weight ratio of PVC and PVDF was 8:2.

Comparative Example 1

A secondary battery was prepared and evaluated in the same manner as in Example 1 except that the weight ratio of the positive electrode active material, PVC and PVDF as positive electrode binders, and carbon black as a conductive assistant was changed to 91:3.6:0.4:5. The weight ratio of PVC and PVDF is 9:1.

Comparative Example 2

A secondary battery was prepared and evaluated in the same manner as in Example 1 except that the weight ratio of the positive electrode active material, PVC as a positive electrode binder, and carbon black as a conductive assistant was made to be 91:4:5. The weight ratio of PVC and PVDF is 10:0.

Comparative Example 3

A secondary battery was prepared and evaluated in the same manner as in Example 1 except that the weight ratio of the positive electrode active material, PVDF as a positive electrode binder, and carbon black as a conductive assistant was changed to 91:4:5. The weight ratio of PVC and PVDF is 0:10.

The capacity retention ratios in Examples 1 to 4 and Comparative Examples 1 to 3 are shown in Table 1. The positive electrode binder containing PVC and PVDF in a weight ratio of PVC:PVDF=9:1 was used in Comparative Example 1, and the positive electrode binder containing only PVC was used in Comparative Example 2, and in both cases, the capacity retention ratio was as low as less than 60%. On the other hand, the positive electrode binder containing PVC and PVDF in a weight ratio of PVC:PVDF=8:2 to 3:7 was used in each of Examples 1 to 4, and the capacity retention ratio of 66.5% or more was shown in every case, which was a value almost at the same level as in Comparative Example 3 where only PVDF was used as the positive electrode binder. Since the temperature range of battery operation is usually about 40° C. or lower, it can be assessed that in the temperature range of actual use, the binder using PVC and PVDF in a weight ratio of PVC:PVDF=8:2 to 3:7 is favorably comparable to the case where only PVDF is used. Although there is naturally no problem with the cycle properties when the ratio of PVDF is higher than the above-described range, the merit of reducing the cost of binder becomes smaller. The change in capacity retention ratio is large between the weight ratios of PVC:PVDF=9:1 (Comparative Example 1) and 8:2 (Example 4). It is assumed that this is because there is a certain threshold value for a desired physical property as a positive electrode binder. For example, when the oxidative decomposition potential of the positive electrode binder is equal to or higher than the potential of the positive electrode, the positive electrode binder hardly undergoes oxidative decomposition and the deterioration is smaller. On the contrary, when the oxidative decomposition potential of the positive electrode binder is equal to or lower than the potential of the positive electrode, the oxidative decomposition of the binder rapidly proceeds particularly under elevated temperatures. In the present embodiment, it is assumed that such threshold value is near the weight ratio of PVC:PVDF=8:2.

TABLE 1

| | Positive electrode binder | | | |
| --- | --- | --- | --- | --- |
| | PVC polymerization degree | PVDF polymerization degree | PVC:PVDF (weight ratio) | Capacity retention ratio (%) |
| Ex. 1 | 1000 | 9000 | 5:5 | 69.2 |
| Ex. 2 | 1000 | 9000 | 3:7 | 69.4 |
| Ex. 3 | 1000 | 9000 | 7:3 | 67.8 |
| Ex. 4 | 1000 | 9000 | 8:2 | 66.5 |
| Com-Ex. 1 | 1000 | 9000 | 9:1 | 58.6 |
| Com-Ex. 2 | 1000 | — | 10:0 | 55.3 |
| Com-Ex. 3 | — | 9000 | 0:10 | 69.8 |

Ex.: Example
Com-Ex.: Comparative Example

Comparative Example 4

A secondary battery was prepared and evaluated in the same manner as in Example 1 except that the weight ratio of the positive electrode active material, PVC (polymerization degree: 500) and PVDF (polymerization degree: 4000) as positive electrode binders, and carbon black as a conductive assistant was 91:2.4:1.6:5. The weight ratio of PVC and PVDF is 6:4.

Comparative Example 5

A secondary battery was prepared and evaluated in the same manner as in Comparative Example 4 except that PVC having a polymerization degree of 800 and PVDF having a polymerization degree of 4000 were used as positive electrode binders.

Example 5

A secondary battery was prepared and evaluated in the same manner as in Comparative Example 4 except that PVC having a polymerization degree of 500 and PVDF having a polymerization degree of 5400 were used as positive electrode binders.

Example 6

A secondary battery was prepared and evaluated in the same manner as in Comparative Example 4 except that PVC having a polymerization degree of 500 and PVDF having a polymerization degree of 9000 were used as positive electrode binders.

Example 7

A secondary battery was prepared and evaluated in the same manner as in Comparative Example 4 except that PVC having a polymerization degree of 1000 and PVDF having a polymerization degree of 4000 were used as positive electrode binders.

Example 8

A secondary battery was prepared and evaluated in the same manner as in Comparative Example 4 except that PVC having a polymerization degree of 1000 and PVDF having a polymerization degree of 5400 were used as positive electrode binders.

Example 9

A secondary battery was prepared and evaluated in the same manner as in Comparative Example 4 except that PVC having a polymerization degree of 1000 and PVDF having a polymerization degree of 9000 were used as positive electrode binders.

The evaluation results of secondary batteries prepared in the above-described Comparative Examples 4 to 5 and Examples 5 to 9 are shown in Table 2. When the polymerization degree of PVDF was same, a higher capacity retention ratio was shown as the polymerization degree of PVC was larger. Also, when the polymerization degree of PVC was same, a higher capacity retention ratio was shown as the polymerization degree of PVDF was larger. Furthermore, in Examples 8 and 9 where the polymerization degree of both PVC and PVDF was high, the capacity retention ratio was further higher, as high as 68% or more.

In addition, the positive electrode active material layer was easy to be peeled off from the positive electrode collector in Comparative Example 4 and Example 5. It is assumed that this is because the polymerization degree of PVC was so low that the adhesive strength as a binder was decreased.

TABLE 2

| | Positive electrode binder | | | |
|---|---|---|---|---|
| | PVC polymerization degree | PVDF polymerization degree | PVC:PVDF (weight ratio) | Capacity retention ratio (%) |
| Com-Ex. 4 | 500 | 4000 | 6:4 | 61.5 |
| Com-Ex. 5 | 800 | 4000 | 6:4 | 62.3 |
| Ex. 5 | 500 | 5400 | 6:4 | 65.8 |
| Ex. 6 | 500 | 9000 | 6:4 | 66.7 |
| Ex. 7 | 1000 | 4000 | 6:4 | 65.9 |
| Ex. 8 | 1000 | 5400 | 6:4 | 68.1 |
| Ex. 9 | 1000 | 9000 | 6:4 | 68.7 |

Com-Ex.: Comparative Example
Ex.: Example

Since the softening point of PVC is as low as 80° C., there is concern about problems such as a change in the electrode thickness occurring in a drying step at elevated temperatures which is performed in order to remove the moisture and solvent in the electrode or the moisture in the battery. Thus, the thickness (D1) of the positive electrode mixture layer was measured immediately after pressing each of the positive electrodes produced in Example 1, Example 4, Comparative Example 2 and Comparative Example 3 with a load of 4.5 ton/cm$^2$. The thickness (D2) of the positive electrode mixture layer was measured in the same manner after the electrodes were dried in vacuum at 90° C. for 15 hours, and the change ratio of the electrode thickness was determined from (D2−D1)/D1×100%. The results are shown in Table 3. In Comparative Example 2 where only PVC was used, the increase ratio of the thickness was large, as large as 7.1%. It is assumed that this is because PVC had a low softening point and the structure-retention property of the electrode was degraded at elevated temperatures. When such a big change in thickness occurs, there arise problems, such as the battery size being larger than the designed value, or the battery capacity being lower than the designed value. On the other hand, in Example 1 and Example 4 where PVDF was mixed in an amount of 20% or more of the total amount of PVC and PVDF, the thickness increase ratio was suppressed to 3% or less. Accordingly, it was shown that, also from the standpoint of battery production, it was preferable to use a mixture of PVC and PVDF in a weight ratio of PVC:PVDF=8:2 to 3:7.

TABLE 3

| | PVC:PVDF (weight ratio) | Thickness increase ratio (%) |
|---|---|---|
| Ex. 1 | 5:5 | 1.1 |
| Ex. 4 | 8:2 | 2.8 |
| Com-Ex. 2 | 10:0 | 7.1 |
| Com-Ex. 3 | 0:10 | 0.0 |

Ex.: Example
Com-Ex.: Comparative Example

EXPLANATION OF SYMBOLS

1: Positive electrode active material layer
2: Negative electrode active material layer
3: Positive electrode collector
4: Negative electrode collector
5: Separator
6: Laminated outer package
7: Negative electrode tab
8: Positive electrode tab

The invention claimed is:

1. An electrode for a lithium ion secondary battery comprising a binder comprising a vinyl chloride resin (PVC) and a polyvinylidene fluoride (PVDF), wherein
the weight ratio of the PVC and the PVDF is PVC:PVDF=8:2 to 3:7,
the polymerization degree of the PVC is 900 or more, and
the polymerization degree of the PVDF is 5000 or more.

2. The electrode for a lithium ion secondary battery according to claim 1, further comprising a positive electrode active material comprising a lithium manganate.

3. The electrode for a lithium ion secondary battery according to claim 2, wherein the lithium manganate is represented by LiMn$_{2-x}$M2$_x$O$_4$ wherein M2 is at least one element selected from the group consisting of Mg, Al, Co, Ni, Fe and B, and 0≤x<2.

4. A lithium ion secondary battery comprising the electrode for a lithium ion secondary battery according to claim 1.

5. A lithium ion secondary battery comprising the electrode for a lithium ion secondary battery according to claim 1 as a positive electrode.

6. A method for preparing an electrode for a lithium ion secondary battery comprising:
a step of preparing a binder by mixing a vinyl chloride resin (PVC) and a polyvinylidene fluoride (PVDF) in a ratio of PVC:PVDF=8:2 to 3:7 (weight ratio); and
a step of applying an electrode slurry obtained by kneading the binder with a positive electrode active material or a negative electrode active material on a collector, wherein
the polymerization degree of the PVC is 900 or more, and
the polymerization degree of the PVDF is 5000 or more.

* * * * *